Figure 1:
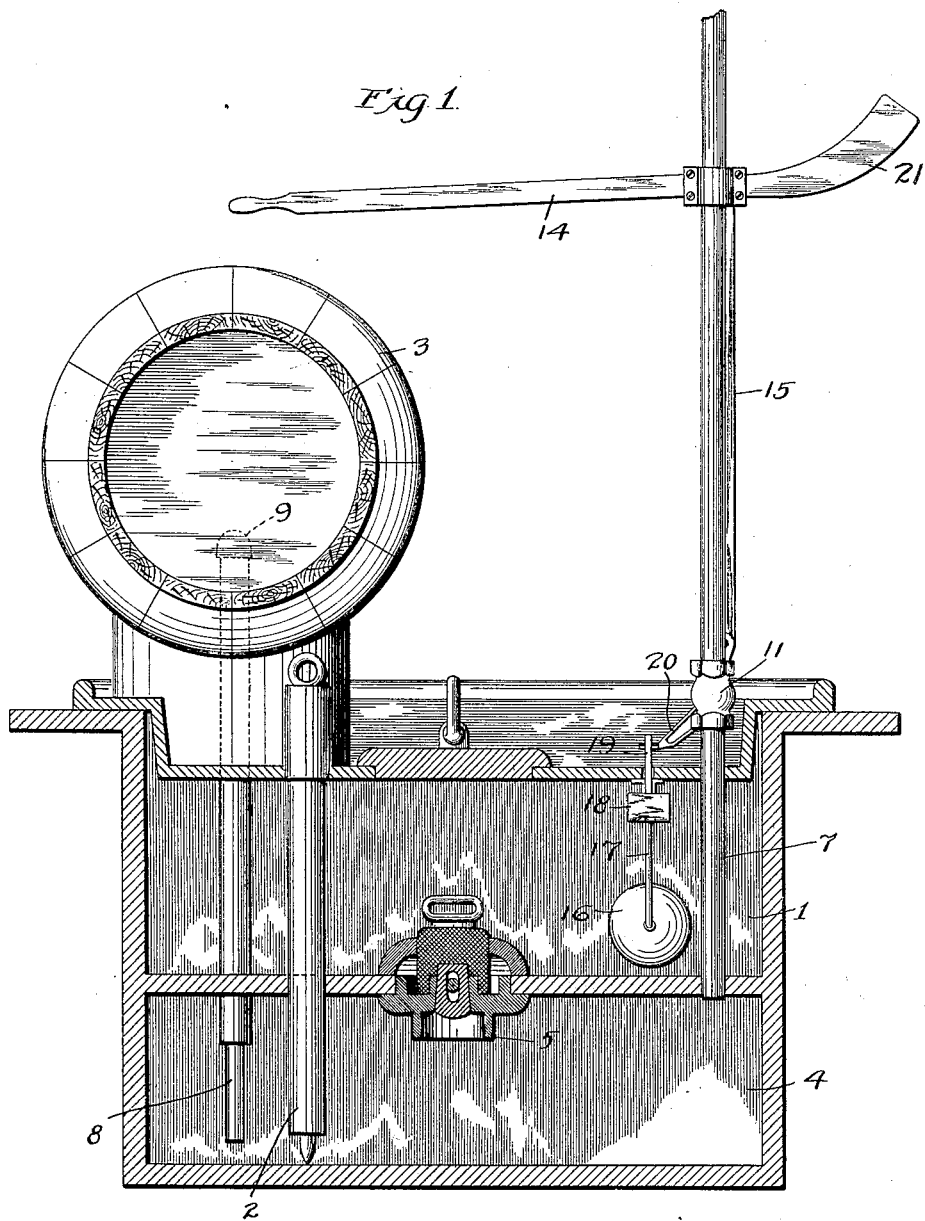

H. & H. E. RAUCH.
APPARATUS FOR PITCHING CASKS.
APPLICATION FILED MAR. 19, 1913.

1,094,810.

Patented Apr. 28, 1914.

2 SHEETS—SHEET 1.

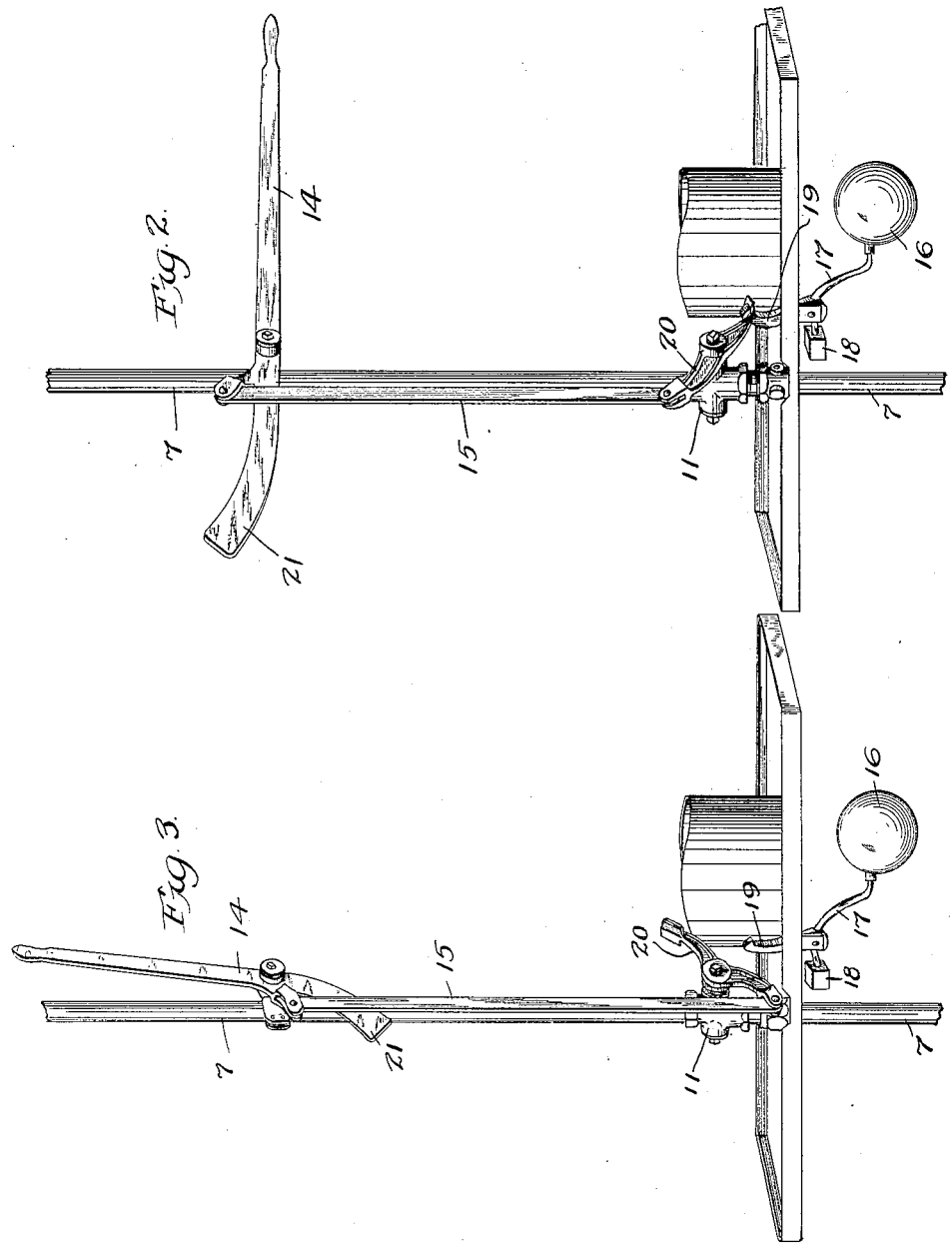

UNITED STATES PATENT OFFICE.

HENRY RAUCH AND HARRY E. RAUCH, OF MOUNT VERNON, NEW YORK.

APPARATUS FOR PITCHING CASKS.

1,094,810.  Specification of Letters Patent.  Patented Apr. 28, 1914.

Application filed March 19, 1913. Serial No. 755,397.

*To all whom it may concern:*

Be it known that we, HENRY RAUCH and HARRY E. RAUCH, both of whom are citizens of the United States, and residents of Mount Vernon, in the State of New York, have invented certain new and useful Improvements in Apparatuses for Pitching Casks, of which the following is a specification.

Our invention relates to apparatuses employed for the purpose of applying hot liquid pitch or the like to the interior surfaces of beer barrels, casks, &c., the principal object of the invention being to provide such an apparatus which shall be safe in operation, the invention being an improvement upon apparatus of the type set forth, for instance, in United States Letters Patent No. 599,476, granted to Henry Rauch on February 22, 1898. An apparatus of the type which is the subject of the said Letters Patent No. 599,476 and of the present invention is designed to be operated by compressed air or similar means, which is admitted into the pitch receptacle and which forces the hot liquid pitch out through a spraying nozzle into the interior of the cask or other vessel which is to be interiorly coated or "pitched." A very short operation of the apparatus is sufficient to accomplish the purpose of the machine, and it is expected, after a certain amount of liquid pitch has been forced out through the spraying nozzle, that the cock governing the flow of the compressed air shall be closed and the spraying operation stopped. It sometimes happens, however, that the person operating the machine does not stop its operation at the proper time, and if such is the case, and compressed air is allowed to flow too long, the result is that the receptacle containing the pitch upon which the compressed air acts is more or less completely emptied of pitch. If this receptacle continues empty of pitch for too long a time, the bottom and walls thereof become unduly heated, and when a new supply of pitch is admitted into this unduly heated receptacle, an explosion sometimes occurs which is not only injurious to the machine but may in some cases be dangerous to the operator of the same.

It is one of the objects of our present invention to provide means by which, in case the operator through forgetfulness or otherwise should omit to stop the operation of the apparatus in proper time, the inflow of compressed air and the forcing out of liquid pitch into the cask or other receptacle being sprayed may be automatically stopped, and a new supply of liquid pitch be admitted into the receptacle before the same has become unduly heated.

Our invention consists of the novel construction, arrangement and combination of various devices and parts as hereinafter fully described and shown in the accompanying drawings.

In the said drawings, Figure 1 is a transverse vertical section of an apparatus constructed according to our invention; Fig. 2 is a perspective view of the safety device which is the subject of the present invention, together with some of the parts of the apparatus which are more directly associated therewith, showing the parts as they are when the operation of spraying is going on; and Fig. 3 is a similar view of the same parts showing the same in the position which they assume when the operation of spraying is suspended and the apparatus is not in use.

The main features of a cask pitching apparatus to which our present invention is applied are fully described in the said Letters Patent No. 599,476, and need not be specified in detail here; and it will be sufficient to state (referring more particularly to Fig. 1 of the present drawings) that 1 represents the kettle or reservoir to contain the pitch, which is mounted over a suitable furnace for heating the same. Below the bottom of the reservoir or kettle 1 and preferably formed integrally therewith is a tank 4, which has an inlet 5 to permit the flow of pitch from the reservoir 1, said inlet being controlled by a suitable valve opening downwardly or inwardly. A pipe 7 leading from some suitable source of compressed air or the like enters the top of the tank 4, and from a point near the bottom of the tank 4 an outlet pipe 8 extends upward and through a close fitting guide in the top of the receptacle 1 and bears at its upper end a perforated spraying nozzle 9. It will be understood that when the machine is operated, the tank 4 being full of liquid pitch, if compressed air is admitted through the pipe 7 it will exert pressure upon the upper surface of the pitch in the tank 4, forcing the same out through the pipe 8 and spraying the same into the barrel 3. This liquid pitch covers the inner surface of the barrel, and the surplus pitch drains down through the bunghole and flows back into the receptacle 1. It is obvious that if the operation of spraying is continued indefinitely the tank 4 will be nearly emptied of pitch, which will flow up into the barrel through the pipe 8, the greater part of the same draining back into the receptacle 1, until the level of the pitch in the tank 4 falls below the lower end of the pipe 8. In the proper use of the apparatus, however, before the operation has proceeded thus far, a three-way cock located at 11 should be turned to shut off the compressed air and stop the operation of the machine. When this is done the pressure is relieved in the tank 4, the compressed air therein flowing back through the outlet of the three-way cock 11, and the valve 5, which has been held closed by the pressure of the compressed air in the tank 4, is allowed to open, and the liquid pitch which has drained back into the receptacle 1 is permitted to flow down into the tank 4. In the embodiment of the invention shown in this application the said three-way cock 11 is operated by means of a handle or lever 14 which is operatively connected with the three-way cock by a bar 15.

The device designated 2 in Fig. 1 is a safety device which forms a part of the apparatus as formerly marketed but which has no direct relation to the present invention.

The present invention contemplates the addition to an apparatus such as is described in said Letters Patent No. 599,476 or the like of a lever pivotally secured to the cover of the pitch receptacle 1 or otherwise suitably located, which lever bears at its outer end a hollow ball adapted to float upon the surface of the liquid pitch in the receptacle 1. In the accompanying drawings the said ball is designated 16 and the lever 17. The said lever bears at its inner end a counterweight 18 and is provided with an upwardly extending trigger-arm 19, which is adapted to engage with one end of a cross-bar 20, attached to the three-way cock. When the apparatus is in the position shown in Figs. 1 and 2 the trigger-arm 19 holds the cross-bar 20 in the position shown in said figures, which is the position in which the compressed air is admitted to the tank 4, but when the cross-bar 20 is released from the trigger-arm 19, the weight of the bar 15, and also of the counterweight 21 on the handle 14 causes the cross-bar 20 to assume the position shown in Fig. 3.

The operation of our invention is as follows: If the spraying is continued for an undue length of time so that the supply of liquid pitch in the tank 4 is depleted, it is obvious that the amount of pitch in the receptacle 1 will be correspondingly increased. As this takes place the ball 16 floats upon the surface of the liquid pitch in the receptacle 1 and rises and operates the lever 17 so that the toe on the end of the trigger-arm 19 is disengaged from the end of the cross-bar 20, thus permitting the three-way cock to close and shut off the passage of the compressed air. The pressure being thus released from the tank 4 the inlet valve 5 opens and permits the pitch in the receptacle 1 to flow out into the tank 4, thus allowing the ball 16 to fall and the trigger-arm 19 to come into position to engage the end of the cross-bar 20 when the apparatus is next placed in the position shown in Figs. 1 and 2, which occurs when the operator desires to again perform the spraying process.

It will be understood that it is not intended that the safety devices which are the subject of the present invention shall ordinarily and normally come into operation, they being only provided for the purpose of acting in case of the absence or inattention of the operator in order to prevent dangerous results. Normally the operation of the machine will be manually stopped before the time at which the above mentioned safety devices are intended to act, the operator raising the handle 14, which lowers the bar 15 and operates the cross-bar 20 of the three-way cock thus shutting off the flow of compressed air. The engagement of the trigger-arm 19 with the end of the cross-bar 20 is such that a moderate force applied to elevate the handle 14 will cause the trigger arm 19 to slip backward and release the cross-bar 20 so as to permit the three-way valve to be closed.

The advantages of our invention will be obvious from what has been above stated concerning its construction and operation.

Having thus described our invention, what we claim as new and desire to secure by Letters Patent is as follows:

1. In an apparatus for pitching casks and the like, the combination with a receptacle adapted to contain liquid pitch, a second receptacle for the same provided with an opening adapted to permit the passage of pitch into said second receptacle from a cask placed thereover, a valve opening from the second named receptacle inwardly into the first named receptacle, an air inlet pipe opening into said first named receptacle and a pitch outlet pipe leading from said first named receptacle adapted to inject pitch into a cask placed over the opening in said second receptacle, said air inlet pipe being provided with a valve adapted to control the passage of air; of devices operatively connected with said valve and adapted to automatically close said valve when pitch in said second named receptacle rises above a predetermined level therein.

2. In an apparatus for pitching casks and the like, the combination with a receptacle adapted to contain liquid pitch, a second receptacle for the same provided with an opening adapted to permit the passage of pitch into said second receptacle from a cask placed thereover, a valve opening from the second named receptacle inwardly into the first named receptacle, an air inlet pipe opening into said first named receptacle, a pitch outlet pipe leading from said first named receptacle adapted to inject pitch into a cask placed over the opening in said second receptacle, said air inlet pipe being provided with a valve adapted to control the passage of air, and means adapted to close said valve; of devices adapted to hold said valve open and to automatically release said valve and permit the same to close when pitch in said second named receptacle rises above a predetermined level therein.

3. In an apparatus for pitching casks and the like, the combination with a receptacle adapted to contain liquid pitch, a second receptacle for the same provided with an opening adapted to permit the passage of pitch into said second receptacle from a cask placed thereover, a valve opening from the second named receptacle inwardly into the first named receptacle, an air inlet pipe opening into said first named receptacle, a pitch outlet pipe leading from said first named receptacle adapted to inject pitch into a cask placed over the opening in said second receptacle, said air inlet pipe being provided with a valve adapted to control the passage of air, and means adapted to close said valve; of devices adapted to hold said valve open and to automatically release said valve and permit the same to close when pitch in said second named receptacle rises above a predetermined level therein; said devices comprising a floating ball and lever provided with a trigger arm adapted to engage with said valve and hold same open when said ball is lowered and to release said valve and permit same to close when said ball is raised.

In witness whereof we have hereunto signed our names this 17th day of March 1913, in the presence of two subscribing witnesses.

HENRY RAUCH.
HARRY E. RAUCH.

Witnesses:
EDMOND CONGER BROWN,
EDMOND L. BROWN.

---

Copies of this patent may be obtained for five cents each, by addressing the "Commissioner of Patents, Washington, D. C."